United States Patent [19]
White et al.

[11] Patent Number: 5,494,698
[45] Date of Patent: Feb. 27, 1996

[54] TEFLON FILLED RESINOID DICING BLADES FOR FABRICATING SILICON DIE MODULES

[75] Inventors: Robert M. White, Rochester; Lawrence H. Herko, Walworth; Robert P. Altavela, Farmington, all of N.Y.

[73] Assignee: Xerox Corporation, Stamford, Conn.

[21] Appl. No.: 334,978

[22] Filed: Nov. 7, 1994

[51] Int. Cl.⁶ .................................................... B05D 3/00
[52] U.S. Cl. ........................... 427/295; 427/358; 427/435
[58] Field of Search ..................................... 427/295, 358, 427/435

[56] References Cited

U.S. PATENT DOCUMENTS

| | | | |
|---|---|---|---|
| Re. 32,572 | 1/1988 | Hawkins et al. | 156/626 |
| 4,097,310 | 6/1978 | Lindmayer | 136/89 SG |
| 4,564,000 | 1/1986 | Stern et al. | 125/13 R |
| 4,633,847 | 1/1987 | Lossl et al. | 125/13 R |
| 4,638,337 | 1/1987 | Torpey et al. | 346/140 R |
| 4,729,905 | 3/1988 | Zhed et al. | 427/295 |
| 4,878,992 | 11/1989 | Campanelli | 156/633 |
| 5,288,521 | 2/1994 | Maldaner | 427/295 |
| 5,306,370 | 4/1994 | Herko et al. | 427/295 |

*Primary Examiner*—Benjamin Utech

[57] ABSTRACT

A resinoid dicing blade having approximately a 20% by volume porosity structure is coated and impregnated with Teflon® by a process which impregnates the resinoid blade with Teflon® to about 0.3 to 0.5% by weight. The Teflon® impregnated dicing blades not only reduces nozzle chipping when bonded silicon wafers are separated into a plurality of individual printhead die, but blade life is significantly increased.

3 Claims, 4 Drawing Sheets

TEFLON FILLED RESINOID DICING BLADES FOR FABRICATING SILICON DIE MODULES

This invention relates to dicing of silicon die modules, such as, for example, an ink jet printhead, and more particularly to dicing silicon die with an improved resinoid dicing blade having Teflon® impregnated therein and method of impregnating the resinoid dicing blades with Teflon®, the improved dicing blade being used to separate die modules for a pair of bonded silicon wafers.

U.S. Pat. No. Re 32,572 to Hawkins et al. discloses a thermal ink jet printhead and several fabricating processes therefor. Each printhead is composed of two parts aligned and bonded together. One part is a substantially flat substrate which contains on the surface thereof a linear array of heating elements and addressing electrodes, and the second part is a substrate having at least one recess anisotropically etched therein to serve as an ink supply manifold when the two parts are bonded together. A linear array of parallel grooves are also formed in the second part, so that one end of the grooves communicate with the manifold recess and the other ends are open for use as ink droplet expelling nozzles. Many printheads can be made simultaneously by producing a plurality of sets of heating element arrays with their addressing electrodes on a silicon wafer and by placing alignment marks thereon at predetermined locations. A corresponding plurality of sets of channel grooves and associated manifolds are produced in a second silicon wafer. In one embodiment, alignment openings are etched in the second silicon wafer at predetermined locations. The two wafers are aligned via the alignment openings and alignment marks, then bonded together and diced into many separate printheads.

U.S. Pat. No. 4,638,337 to Torpey et al. discloses an improved thermal ink jet printhead similar to that of Hawkins et al., but has each of its heating elements located in a recess. The recess walls containing the heating elements prevent the lateral movement of the bubbles through the nozzle and therefore the sudden release of vaporized ink to the atmosphere, known as blow-out, which causes ingestion of air and interrupts the printhead operation whenever this event occurs. In this patent a thick film organic structure such as Riston® or Vacrel® is interposed between the heater plate and the channel plate. The purpose of this layer is to have recesses formed therein directly above the heating elements to contain the bubble which is formed over the heating elements, thus enabling an increase in the droplet velocity without the occurrence of vapor blow-out and concomitant air ingestion.

U.S. Pat. No. 4,097,310 to Lindmayer discloses a method of forming silicon solar cells by forming an electron generating junction on a single crystal wafer followed by a diamond blade cut through the wafer. Rotation speeds for the diamond blade fall into the range of 5,000 to 20,000 rpm with a corresponding cutting speed of 0.05 to 10 inches per second.

U.S. Pat. No. 4,564,000 to Stern et al. discloses a method of cutting ferrite materials using a resin bonded diamond sawblade at a cutting speed of 5400 centimeters per second. The blade itself has a diameter of 2.25 inches. Cooling means are applied to the blade to prevent overheating of the blade and the ferrite.

U.S. Pat. No. 4,633,847 to Lossl et al. discloses a multiple-blade internal hole sawing method for cutting crystal-line rods into thin wafers while maintaining a connection between adjacent cut wafers. The wafers can be cut into thicknesses ranging from 0.1 mm to 1.0 mm. Connecting agents, such as wax, are used to mechanically connect the cut wafers but can easily be removed by solvent or heating U.S. Pat. No. 4,878,992 to Campanelli discloses an ink jet printhead fabrication process wherein a plurality of printheads are produced from two mated substrates by two dicing operations. One dicing operation produces the nozzle face for each of a plurality of printheads and optionally produces the nozzles. This dicing blade, together with specific operating parameters, reduces chipping from the nozzles, and scratches and abrasions from the nozzle faces. A second dicing operation with a standard dicing blade severs the mated substrates into separate printheads. The dicing operation which produces the nozzle face is preferably conducted in a two-step operation. A first cut makes the nozzle face, but does not sever the two mated substrates. A second dicing cut severs the two substrates, but does so in a manner that prevents contact by the dicing blade with the nozzle face.

Micro-electromechanical systems (MEMS) are generally produced by the bonding of two silicon wafers by a thick film layer, such as polyimide. One of the silicon surfaces covered by the thick film layer has electrical circuitry thereon and and the thick film layer may be patterned to provide recesses for fluid flow or the accommodation of other micro-sized devices therein. Generally, a plurality of MEMS die modules are in one silicon wafer pair which is diced into a plurality of individual die modules. A thermal ink jet printhead is a specific example of a MEMS die module, and a reduction in scarring and chipping is especially useful when the separation of the printhead die currently produces the printhead nozzle faces.

As is well known in the ink jet printing industry, the nozzle or orifice size, shape, and surface conditions affect the characteristics and directionality of an ink droplet ejected from the printhead nozzles. In the above prior art, ink jet printheads are fabricated from two silicon wafers, one of which contains recesses in the confronting surface thereof. When the wafers are aligned and bonded together, the recesses form ink channels and reservoirs. Dicing the two wafers separates the printheads and concurrently opens one end of the ink channels creating the nozzles in a nozzle face. The dicing blade and dicing procedure of U.S. Pat. No. 4,878,992 improved the yield of printheads, but some nozzle chipping remained a serious problem.

Separation of silicon die modules is a demanding technical task, especially when a front nozzle face of a printhead die must be provided by dicing which is chip-free and must have a smooth finish. The established method to do this has been to use a diamond filled resinoid dicing blade at a high RPM with water cooling. Resinold blades are the dicing blade type by choice because they sacrificially wear by design to prevent or to mitigate silicon die module chipping. However, chipping has been found to occur anyway, and the chipping is believed to be caused by the forces generated when the pieces of silicon or diamond particles loosened from the dicing blade become momentarily jammed between the rotating dicing blade and the silicon wafers.

SUMMARY OF THE INVENTION

It is an object of the present invention to fill voids or impregnate a resinoid dicing blade with Teflon® and to use the Teflon® impregnated dicing blade for separating silicon die modules from a pair of bonded silicon wafers.

In the present invention, a plurality of silicon die modules are produced by dicing two bonded silicon wafers with a Teflon® impregnated resinoid dicing blade. Teflon® is impregnated into resinoid dicing blades having approximately a 20% by volume structure by immersing them into a solution comprising 2% by weight Teflon AF® the generic composition being amorphous polytetrafluoroethylene dissolved in a solvent, such as TC-75 by the 3M Company. The Teflon® solution with the dicing blades immersed therein is placed into an evacuation chamber and a vacuum is drawn. When air from the exposed pores in the dicing blades are removed, the chamber is returned to atmospheric pressure. The dicing blades are removed from the Teflon® solution and drained of excess Teflon® solution and dried by allowing the residual solvent to evaporate. The Teflon® impregnated dicing blades have about 0.3 to 0.5% by weight Teflon.

Using a thermal ink jet printhead as a typical silicon die module, the bonded wafer pair containing the plurality of printheads is notched by dicing on opposite exposed surfaces along the dicing lines or streets which separate the printheads, so that the final separating dicing cut by the Teflon® filled or impregnated resinoid dicing blade cuts the wafer between aligned notches. This enables the nozzle faces to be produced by the Teflon® impregnated blade with a minimum of silicon material to sever and without causing the blade to contact the sticky material holding the wafer pair on the dicing frame, thus increasing the blade life.

A more complete understanding of the present invention can be obtained by considering the following detailed description in conjunction with the accompanying drawings, wherein like parts have like index numerals.

DESCRIPTION OF THE PREFERRED EMBODIMENT

Figure 1:
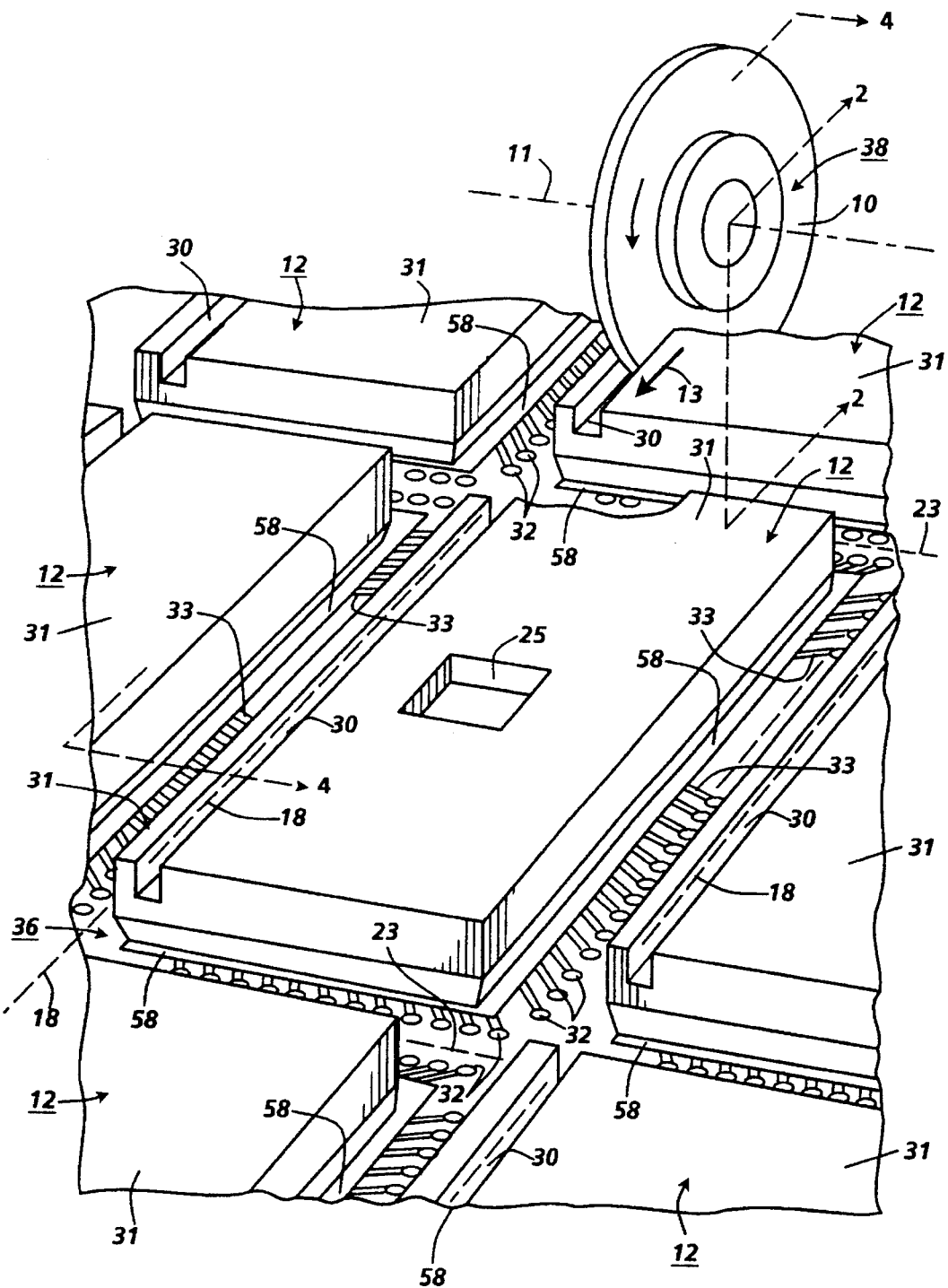
FIG. 1 is an enlarged isometric view of the channel wafer bonded to the heating element wafer, after the excess channel wafer material has been removed to expose the addressing electrode terminals, and showing the dicing blade of the present invention as it forms the nozzle containing surfaces of the printheads.

Referring to FIG. 1, a Teflon® filled or impregnated resin-based dicing blade 10 of the present invention is shown cutting along a previously diced notch 30, that is located across an edge of the channel plates 31, and in the direction of arrow 13 to form the nozzles 27 and nozzle face 29 (see FIGS. 2 and 4) for the plurality of printheads 12. Prior to this dicing operation, the notches 30 are diced along the dicing lines 18 (shown in dashed line) between the plurality of printhead die 12 in the bonded wafers. Notch 30 is diced in the channel wafer, while a similar notch 35 is diced in the heater wafer, so that the notches 30,35 are aligned to reduce the silicon material therebetween (Refer to FIGS. 2 and 4). Also, prior to the separating dicing cut and after the notches are formed, excess silicon material is milled from the silicon channel wafer or upper substrate to form the individual channel plates 31 and uncover the addressing electrode terminals 32. As disclosed in U.S. Pat. No. 4,638,337 to Torpey et al. and incorporated herein by reference, etched grooves and recesses (not shown) around the periphery of the channel plates 31 greatly assist in preventing damage to the addressing electrodes 33 and their terminals 32 during this silicon removal step by spacing the channel wafer therefrom.

A thick film polymer layer 58, preferably polyimide, is sandwiched between the channel plates 31 and the heater wafer 36 and is etched to remove it from the distal ends of the electrodes 33 and their contact pads or terminals 32. Each channel plate has an inlet 25 which may be separately etched in the channel plates or they may be simply formed by etching the manifold 22 (see FIG. 1) completely through the channel wafer from which the channel plates 31 are formed.

The resinoid dicing blade 10 is rotated about axis 11. For a dicing blade having a diameter of 2 to 4.7 inches and a thickness of about 4–10 mils, the speed may range from 20,000 to 60,000 rpm. The blade has a relatively hard, porous resin bonded base material with substantially no abrasive fillers and contains a 60 to 90% concentration of natural or synthetic diamonds having a nominal diamond size range of 2 to 6 micrometers. The density reference is based in 72 carats per cubic inch. The porosity of the resinoid dicing blade is approximately 20% by volume, and has Teflon AF® impregnated therein by a process discussed later. The Teflon® filled or impregnated dicing blades contain about 0.3 to 0.5% Teflon® by weight.

The dicing cut to provide the nozzle containing surface with the appropriate surface finish and optionally to open the nozzles is made along the notches 30,35. The dashed cutting lines 23 which are perpendicular to the notches 30,35 delineate the travel of a standard dicing blade to complete the sectioning of channel plates 31 and heater wafer 36 into separate printheads 12.

Figure 2:
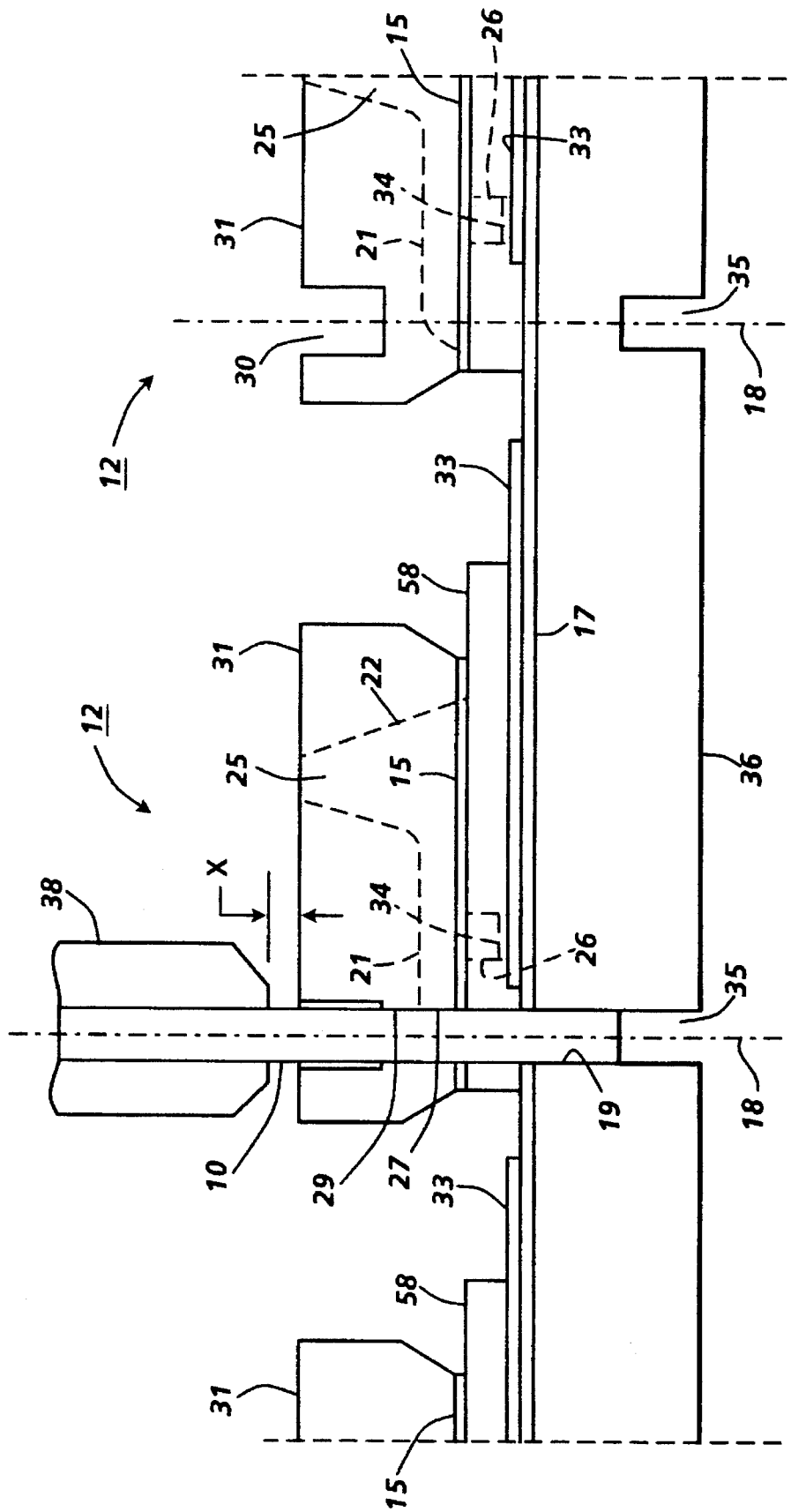
FIG. 2 is an enlarged partially shown cross sectional view of FIG. 1 taken along a plane including the dicing blade axis of rotation and blade portion along a radius located normal to the wafers.

FIG. 2 is a cross sectional view of FIG. 1 as viewed along view line 2—2 and shows that the dicing blade 10 cuts through the channel plates 31, thick film layer 58, adhesive bonding layer 15, electrode insulating underglaze layer 17, passivation layer (not shown), and into the heating element wafer 36 for the distance required to meet the notch 35. In general, the blade penetration depth versus blade width ratio falls within the range of 6:1 to 9:1. If the ratio is 10:1 or higher, the blade will wander, thus eliminating the saw cut's positional accuracy of ±0.1 mils. A high ratio also deleteriously affects nozzle surface quality. The ink channel 21, manifolds or reservoirs 22, and heating elements 34, shown in pits or recesses 26 in the thick film layer 58 are shown in dashed line for reference to the notches 30 and 35 which are centered on dicing cut centerline 18. Although in the preferred embodiment the dicing blade 10 only cuts between notches 30,35 in the channel plates and heater wafer, respectively, it could completely cut through both the channel plates 31 and heating element wafer 36. The penalty for this complete cut through is a shorter life of the resin bonded blade. The shorter life is caused by the adhesive used to hold the heating element wafer 36 to a standard wafer holding film frame (not shown).

Another critical aspect of the dicing procedure is the blade exposure minus the penetration depth referred to in FIG. 2 as "X". The value "X" must fall into the range of 6 to 12 mils. Less than 6 mils, clearance and coolant cannot get to the blade. This causes high friction resulting in a stressed cut and subsequent nozzle damage. More than 12 mils clearance and the blade vibrates and damages the nozzle and scars the nozzle face 29.

For the integrated circuit industry, the ability to process die modules by sawing or dicing is well known, but being able to create a nozzle face surface having an acceptable surface finish via dicing alone is difficult. By omitting a subsequent finishing operation, such as polishing, the fabrication of a relatively smooth surface by high quality dicing allows higher throughput of devices, resulting in an extremely economical and cost effective manufacturing operation.

Figure 4:
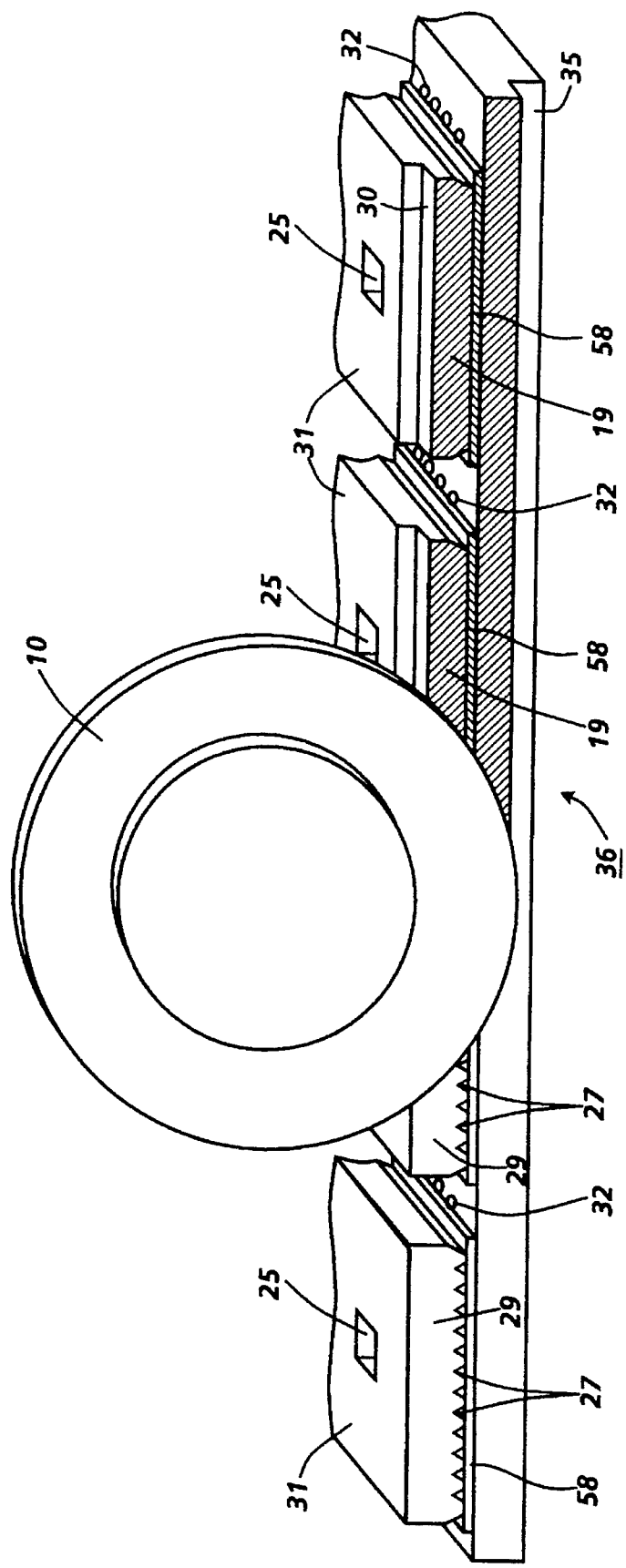
FIG. 4 is a partial, cross sectional isometric view of FIG. 1 showing the formation of the nozzle containing surface.

FIG. 4 is an isometric view of the heating element wafer 36 and the channel plates 31 bonded thereto as viewed along view line 4—4 of FIG. 1. As the dicing blade 10 of the present invention cuts along cutting line 18, which is in the center of the notches 30,35, nozzles 27 and nozzle containing surface 29 are formed and the heating element wafer is severed in parallel strips. A second dicing cut along dicing line 23, which are perpendicular to dicing cut lines 18, completes the separation of printhead die from the originally bonded wafer pair.

Figure 3:
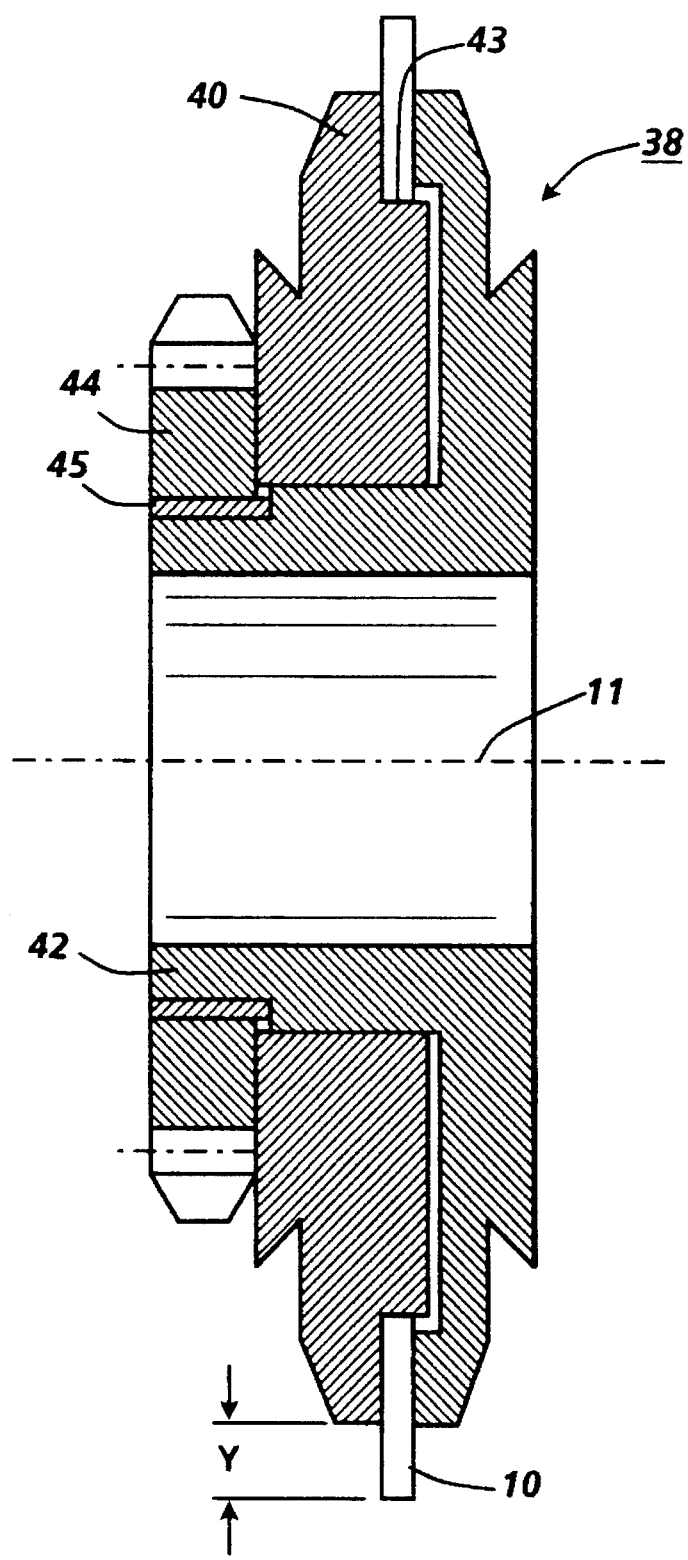
FIG. 3 is a cross sectional view of the dicing blade of the present invention in a blade holder or flange.

FIG. 3 is a schematic cross sectional view of a typical dicing blade holder or flange assembly 38 which comprises inner flange 40 and outer flange 42 between which the dicing blade 10 is held on the circular shoulder 43 of inner flange 40. Flange nut 44 tightened on screw threads 45 of outer flange 42 lock the dicing blade in place. The blade holder is mounted on a rotatable shaft (not shown) which rotates the blade holder about axis 11. The exposure of the blade identified as "Y" is that part of the circular dicing blade which extends from the blade holder and referred to as the exposure. As discussed above, the blade exposure "Y" minus the depth of penetration of the blade into the material being cut is identified by the dimension "X" in FIG. 2 and is, of course, a critical aspect of this dicing operation as discussed above.

A resinoid dicing blade similar to that disclosed in U.S. Pat. No. 4,878,992 to Campanelli, which patent is incorporated herein by reference, has the further requirement that it has surface pores and approximately a 20% by volume porosity structure. A Teflon® solution is prepared in a container (not shown). To obtain this solution, Teflon AF® by the Dupont Co. of Wilmington, Del. is dissolved in a Fluorinert the generic composition being perfluorooctane solvent, available as TC-75 solvent from The 3M Company in St. Paul, Minn. Enough Teflon AF® is dissolved in the solvent to make a 2% Teflon AF® by weight solution. The ingredients are added in a glass jar, and the jar with the ingredients is rolled on a rolling mill at atmospheric pressure and room temperature to mix the dissolved Teflon AF® and Fluorinert solvent. The mixing time is approximately four hours. Next, a plurality of resinoid blades are immersed into the solution and the container with the solution and resinoid blades are placed in a vacuum chamber (not shown) and a vacuum is drawn. The immersed resinoid blades are left submerged in the vacuum until substantially all air from the exposed pores is removed. If the vacuum chamber is transparent or has a transparent window, the air is removed when the bubbling stops; this usually takes about 10 to 30 minutes in the evacuated vacuum chamber. The vacuum chamber is then returned to atmospheric pressure. The cycle time depends upon the porosity of the resinoid dicing blades, and for a resinoid blade with a porosity of about 20% by volume it takes about 15 minutes. Returning the immersed resinoid blades to atmospheric pressure assures all open pores are filled with the Teflon AF® solution. The resinoid blades are removed one at a time, drained, and dried with an absorbent sheet, such as a paper towel to remove all excess Teflon AF® solution from the resinoid blade surface. The Teflon AF® impregnated resinoid blades are allowed to set at ambient conditions until the residual solution in the blade is evaporated, which usually takes about three hours. This process provides that the resinoid blades contain about 0.3 to 0.5% of Teflon AF® by weight.

Following the operating parameters below and using a Teflon AF® impregnated blade obtained by the process above significantly reduced printhead nozzle chipping and increased yield by about 10%. Further, the resinoid blade life is significantly increased, for an average of 10% to 20% more wafer pairs diced.

The operating parameters to achieve the desired nozzle and nozzle face surface finish are as follows:

(a) using the Teflon AF® filled or impregnated resinoid dicing blade, wherein the ratio of the dicing blade penetration depth versus blade width is within the range of 6:1 to 9:1. Since the blade thickness is dependent upon the depth of cut as well as thickness of the material to be cut (i.e., the distance between notches 30,35), the preferred blade thickness is about 6 to 8 mils for penetration of about 30 to 40 mils and distance between notches is about 20 to 30 mils. A higher ratio will cause the blade to wander, thus reducing the quality of the cut.

(b) the feed speed of the Teflon AF® filled blade is about 4,000 inches per second or about 40,00 RPM for a two inch diameter dicing blade.

(c) the blade exposure minus the blade penetration depth is indicated in FIG. 2 by the dimension "X". The blade exposure is that portion of the dicing blade extending from the blade holder or flange assembly 38. This value must fall within the range of 6 to 12 mils. Less than 6 mils clearance and coolant cannot adequately contact the blade. An uncooled blade causes high friction which wears the blade and chips or damages the nozzles and nozzle face. More than 12 mils clearance and the blade vibrates which again results in damaged nozzles and nozzle face.

The Teflon AF® filled resinoid dicing blade of the present invention used within the above operating parameters enable 30 to 60 wafer pairs to be diced into individual printhead die per blade. With about 250 printhead die per wafer pair, 7,500 to 15,000 printhead die could be produced by a single Teflon AF® filled resinoid dicing blade, each substantially chip-free for about a 98% yield.

Many modifications and variations are apparent from the foregoing description of the invention and all such modifications and variations are intended to be within the scope of the present invention.

We claim:

1. A method of producing a Teflon® filled resinoid dicing blade, comprising the steps of:

(a) preparing a Teflon® solution of solvent of a perfluorooctane and soluble amorphous polytetrafluoroethylene having 2% amorphous polytetrafluoroethylene by weight in a container;

(b) immersing a plurality of resinoid dicing blades in the Teflon® solution in the container, the resinoid blades having exposed pores and a porosity of about 20% by volume;

(c) placing the container with the Teflon® solution and resinoid blades immersed therein in a vacuum chamber;

(d) drawing a vacuum in the vacuum chamber and maintaining the vacuum in the vacuum chamber until substantially all air is removed from the exposed pores of the resinoid blade;

(e) returning the vacuum chamber to atmospheric pressure so that all exposed pores of the resinoid blade are filled with the Teflon® solution;

(f) removing the container from the vacuum chamber and removing the resinoid blades from the Teflon® solution;

(g) draining the excess Teflon® solution from the resinoid blades; and (h) evaporating the solvent from the Teflon® solution on the resinoid blade pores, thereby filling the resinoid blade pores with solid amorphous polytetrafluoroethylene.

2. The method of claim 1, wherein step (a) further comprises the steps of:

placing the amorphous polytetrafluoroethylene and perfluorooctane solvent in a glass jar;

rolling the glass jar with the amorphous polytetrafluoroethylene and perfluorooctane solvent on a rolling mill at atmospheric pressure and room temperature to dissolve and mix the amorphous polytetrafluoroethylene and solvent for about 4 hours.

3. The method of claim 2, wherein the method further comprises the steps of:

(i) drying resinoid blades with an absorbent sheet to remove all excess amorphous polytetrafluoroethylene solution from the surfaces thereof after step (g); and wherein the evaporation of the solvent takes about 3 hours at ambient conditions.

* * * * *